Sept. 20, 1966 R. BORYSTHEN-TKACZ 3,273,339
PROPULSION SYSTEM FOR HIGH SPEED VTOL AIRCRAFT
Filed July 1, 1964 2 Sheets-Sheet 1
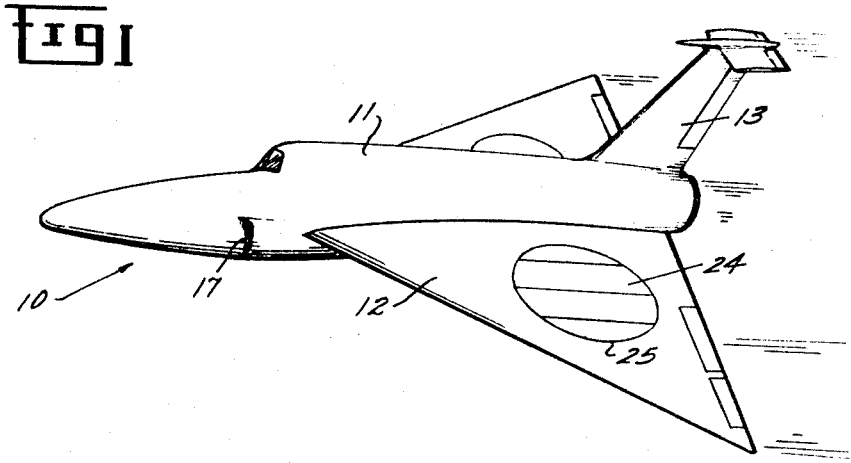
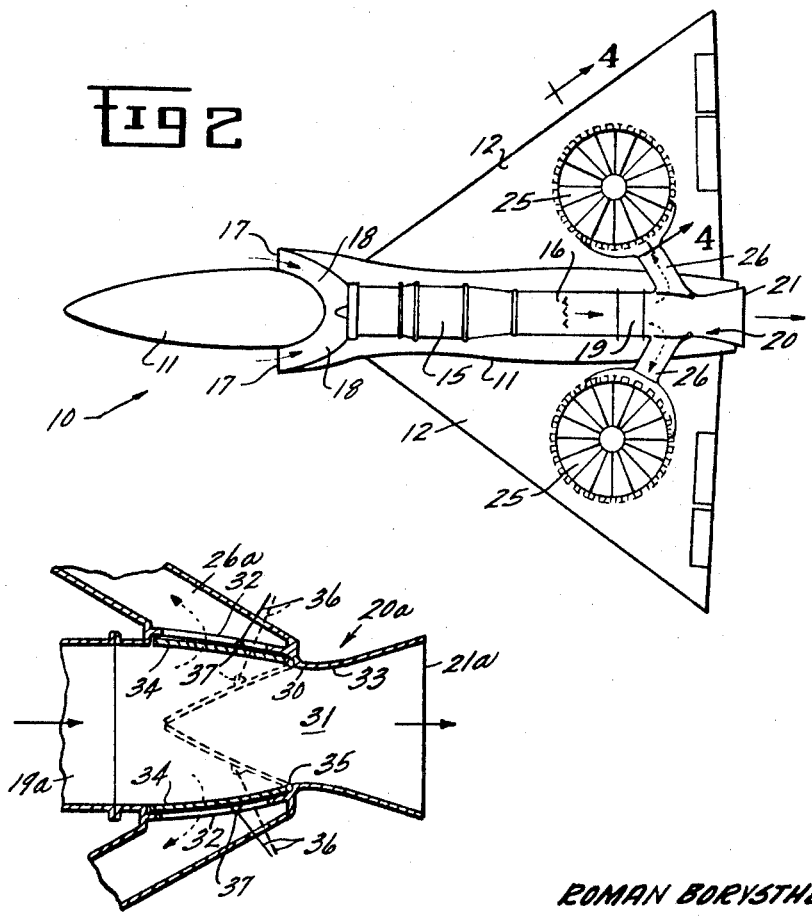
INVENTOR.
ROMAN BORYSTHEN-TKACZ
BY
George R Powers
ATTORNEY Sept. 20, 1966  R. BORYSTHEN-TKACZ  3,273,339
PROPULSION SYSTEM FOR HIGH SPEED VTOL AIRCRAFT
Filed July 1, 1964  2 Sheets-Sheet 2
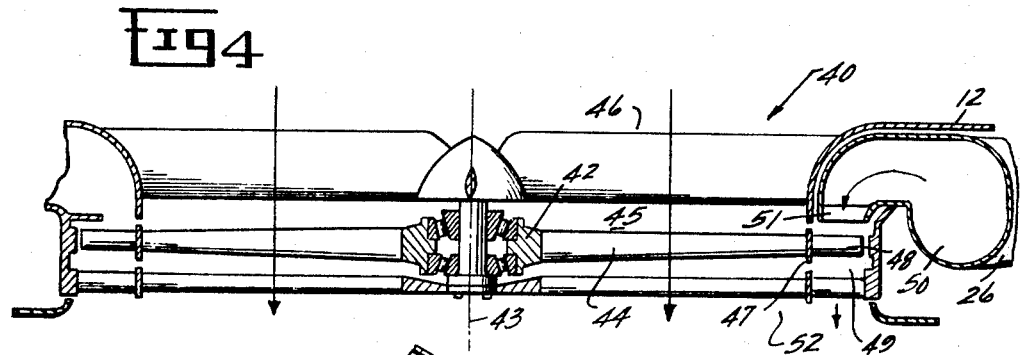
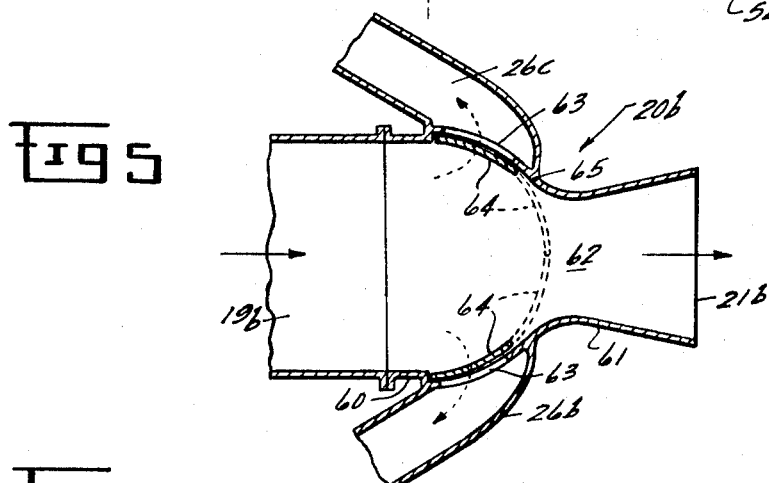
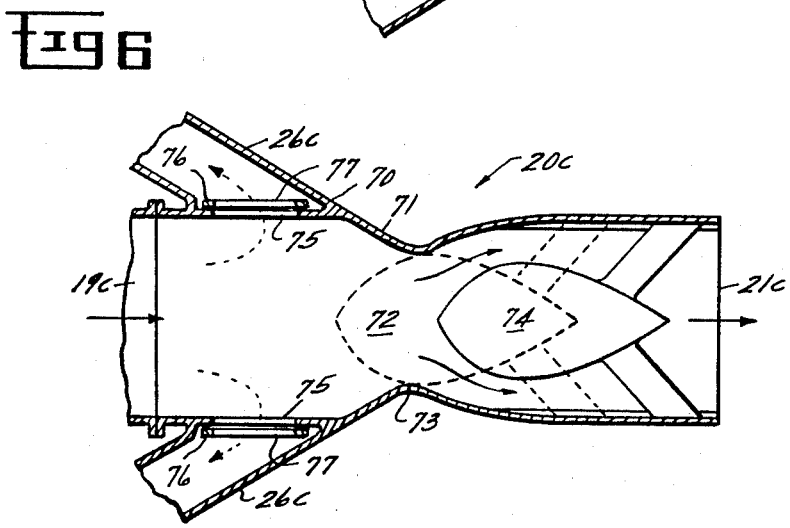
INVENTOR.
ROMAN BORYSTHEN-TKACZ
BY
George R. Powers
ATTORNEY—

United States Patent Office 3,273,339
Patented Sept. 20, 1966

3,273,339
PROPULSION SYSTEM FOR HIGH SPEED
VTOL AIRCRAFT
Roman Borysthen-Tkacz, Beverly, Mass., assignor to General Electric Company, a corporation of New York
Filed July 1, 1964, Ser. No. 379,458
6 Claims. (Cl. 60—35.54)

This invention relates to a propulsion system for VTOL aircraft and, more particularly, to a propulsion system having high performance capabilities in both the horizontal and the vertical modes of aircraft operation.

Since VTOL—vertical take-off and landing—aircraft are capable of taking off and landing in the vertical direction, they can be operated in areas devoid of conventional airstrips. VTOL aircraft are therefore particularly suited for combat support functions and for flights into and out of densely populated urban areas. With respect to such military and civil applications, it may be desirable to provide, in combination with the vertical flight capability, a capability of supersonic level flight. Unfortunately, however, experience has shown that it is not an easy matter to provide a propulsion system capable of producing high performance output in both the horizontal and vertical modes of operation.

It is well known that a propulsion system achieves its maximum propulsion efficiency when the speed of the aircraft approaches as nearly as possible the velocity of the propulsion stream relative to the aircraft. Under such conditions, relatively little excess energy is dissipated in the atmosphere since the propulsion fluid is discharged with low absolute velocity. Accordingly, it is generally recognized that for the low speed take-off phase of operation higher thrust and better fuel economy are obtained by discharging a propulsion stream of relatively great weight at moderate velocity, while for supersonic flight a lightweight, high velocity jet stream is to be desired. The conflicting requirements of the two modes of operation have led aircraft designers to propose that various thrust augmenting devices be used for producing take-off thrust. These devices increase the effective total momentum of the propulsion jet by increasing the mass flow and decreasing the velocity. A system that has come into prominence is the use of lift fans driven by the combustion products, the fans being mounted in the vehicle wings or fuselage. The increased vertical lift is obtained by moving large quantities of low pressure air through the fans at relatively low velocity and discharging the composite stream of combustion products and air downwardly to lift the aircraft. An afterburner and a variable area exhaust nozzle are typically used in combination with such an arrangement to produce the high jet velocities required for supersonic flight, a diverter valve being positioned between the gas generator and the afterburner for directing the entire flow of combustion products to either the lift fans or the afterburner and the exhaust nozzle.

It has been found in practice that in VTOL aircraft that the maximum lift capability is the most critical design feature. Therefore, prior art power plants, which are of course designed and sized to develop sufficient thrust during take-off, typically have excessive capacity during the level flight phase of operation. In other words, prior art propulsion systems are generally larger and heavier than required for supersonic flight. In addition, prior art diverter valves add substantially to the overall weight and complexity of the propulsion systems. As a result, the rate of fuel consumption, maneuverability of the aircraft, and other performance characteristics are adversely affected by the excessive weight and bulk.

It is therefore a primary object of this invention to provide for VTOL aircraft an improved propulsion system having high performance capabilities in both the horizontal and vertical modes of aircraft operation.

Another object of this invention is to provide for VTOL aircraft a propulsion system capable of producing sufficient thrust for take-off without being excessively heavy and having substantially greater capacity than required for supersonic flight.

A further object of this invention is to provide for VTOL aircraft a lightweight, high Mach number propulsion system capable of high performance output in all modes of aircraft operation.

A still further object is to provide for VTOL aircraft a lightweight, economical propulsion system capable of producing high thrust during the take-off and landing phases and propelling the aircraft at supersonic speed during the level flight phase of aircraft operation.

Briefly stated, in accordance with the illustrated embodiments of the invention, a conventional gas generator is directly coupled to an afterburner in which combustion is sustained during both vertical and horizontal modes of aircraft operation. Upon being discharged from the afterburner, the combustion products are either delivered to one or more thrust augmenters such as lift fans or discharged through an exhaust nozzle designed for high speed flight. In accordance with the present invention, the diverter valve structure for selectively directing the flow of combustion products and the exhaust nozzle are preferably combined into a single structural arrangement.

While the invention is distinctly claimed and particularly pointed out in the claims appended hereto, the invention, both as to organization and content, will be better understood and appreciated, along with the other objects and features thereof, from the following detailed description when taken in conjunction with the drawing, in which:

FIG. 1 is a pictorial view of a VTOL aircraft having the propulsion system of this invention;

FIG. 2 is a schematic view of the VTOL aircraft of FIG. 1 illustrating the location of the various components comprising the propulsion system;

FIG. 3 is a view of a first embodiment of the combination exhaust nozzle-diverter valve assembly forming a portion of the propulsion system;

FIG. 4 is a cross-sectional view taken along line 4—4 of FIG. 2 of one of the lift fans utilized in the propulsion system;

FIG. 5 is a view of a second embodiment of the combination exhaust nozzle-diverter valve assembly; and FIG. 6 is a view of a third embodiment of the combination exhaust nozzle-diverter valve assembly.

With reference to FIGS. 1 and 2, a VTOL aircraft indicated generally by the numeral 10 is illustrated, the aircraft 10 having a fuselage 11, wings 12, and a tail assembly 13. These elements are typical of those well-known in the aircraft art and, except as being necessary components of a fully operative aircraft, do not form part of the present invention. It will also be understood, although not illustrated in detail by the drawing, that the aircraft 10 is equipped with other conventional components, such as movable control surfaces and a landing gear assembly, which are required for a fully operative aircraft.

The propulsion system of the present invention will now be described. As best shown by FIG. 2, a gas generator 15 and an afterburner 16 are mounted within the aircraft fuselage 11 and together form a gas producing means for producing products of combustion having an extremely high energy level. The gas generator 15 is essentially a gas turbine engine of the well-known turbojet type, a detailed description of its inner construction and operation therefore being unnecessary at this point. Ambient air is drawn into the gas generator 15 through an inlet opening 17 and an inlet duct 18 in the fuselage. The high energy products of combustion produced by the gas producing means are discharged from the afterburner 16 into an exhaust conduit 19 and a combination exhaust nozzle-diverter valve 20 illustrated schematically by FIG. 2. Three structural embodiments of the combination exhaust nozzle-diverter valve 20 are illustrated by FIGS. 3, 5, and 6 and will be described presently.

Returning now to consideration of FIGS. 1 and 2, a pair of lift fans 25 are mounted in the wings 12, the fans being symmetrically located with respect to the longitudinal axis of the aircraft 10. A gas conduit 26 connects the combination exhaust nozzle-diverter valve 20 to each of the lift fans 25. The lift fans 25 are equipped with doors 24 as shown by FIG. 1 which can be closed when the aircraft 10 is in forward flight.

Before proceeding with a detailed description of the various elements comprising the propulsion system, its operation will be described briefly. The high energy products of combustion produced by the gas producing means and supplied through the conduit 19 to the combination exhaust nozzle-diverter valve 20 are either discharged through the exhaust opening 21 as a high velocity stream or supplied to the lift fans 25 to drive the fans. The combination exhaust nozzle-diverter valve 20 and the exhaust opening 21 are disposed such that a high velocity stream exhausted therefrom is directed rearwardly so as to propel the aircraft 10 in the forward direction at high speed. The lift fans 25 are disposed such that propulsive streams exhausted therefrom are directed downwardly so as to produce lift forces on the aircraft 10. It will be observed that combustion occurs in the afterburner during operation in the vertical mode as well as during horizontal operation of the aircraft. As a result, the gas producing means is capable of operating at maximum output during vertical operation as well as during horizontal operation. Therefore, the required vertical thrust can be produced by a propulsion system substantially smaller and lighter than prior art systems in which the afterburner is utilized only during supersonic flight.

Attention is now directed to FIG. 3, which illustrates a first structural embodiment of the combination exhaust nozzle-diverter valve assembly 20 schematically illustrated by FIG. 2. As shown in FIG. 3, the exhaust nozzle-diverter valve assembly 20a has a housing 30 forming an internal passage 31 therein, which with the exhaust conduit 19a comprises a passageway or conduit connecting the gas producing means and the exhaust opening 21a. The housing 30 has at least two ports 32 joining the upstream portion of the internal passage 31 and the gas conduits 26a leading to the lift fans in fluid flow relationship. The exhaust nozzle-diverter valve assembly 20a has a wall 33 downstream of the ports 32, the wall 33 diverging outwardly in the downstream direction and terminating in the exhaust opening 21a. A plurality of valve segments or plates 34 are pivotally mounted at their downstream ends at 35, the plates 34 being movable between first positions illustrated by solid lines and second positions illustrated by broken lines. In the first positions, the plates 34 block the ports 32 to prevent flow through the gas conduits 26a to the lift fans. In addition to blocking the ports 32, the plates 34 in the first position form a wall converging in the downstream direction and, in combination with the wall 33, give the internal passage 31 a converging-diverging configuration suitable for supersonic flight. In the second position, the plates 34 project into and block the internal passage 31 to prevent flow therethrough, the ports 32 thereby being uncovered and the combustion products flowing through the gas conduits 26a to drive the lift fans. The valve plates 34 may be moved between the first and second positions by any suitable actuating arrangement. As illustrated, an actuating rod 36 is pivotally connected at 37 to each plate 34, at rod 36 being driven by a pilot operated force producing means such as, for example, a hydraulic cylinder arrangement (not shown). Other arrangements, such as a rack and pinion structure, will also be obvious to those skilled in the art.

Before describing in detail alternative embodiments of the combination exhaust nozzle-diverter valve 20, a typical fan assembly as shown by FIG. 4 will be described briefly. The fan assembly indicated generally by the numeral 40 is located in the wing 12, the rotor of a single stage fan being rotatably mounted on the fan hub 42 for rotation about a vertical axis 43. The single stage fan has a compressor portion comprising a plurality of compressor blades 44 spanning a passageway 45 having an inlet 46 on the upper surface of the wing 12. The outer tips of the compressor blades 44 are joined by a circumferential shroud 47, and a turbine portion comprising a plurality of radial turbine buckets 48 which are mounted on the shroud 47 extends outwardly of the compressor portion. The turbine buckets 48 project into an annular groove 49 in the wing structure, and the gas conduit 26 coming from the combination exhaust nozzle-diverter valve 20 supplies high energy combustion products to a scroll 50 which is aligned with at least a portion of the annular groove 49. The vanes 51 direct the combustion products to the turbine buckets 48 at the proper direction and at the proper velocity to drive the fan. Air is drawn through the inlet 46 into the passageway 45 where it is accelerated by the compressor blades 44. The stream of combustion products is decelerated as it flows through the turbine buckets 48, its extracted energy being used to drive the fan 41 and accelerate the air drawn into the inlet 46. The decelerated stream of combustion products leaving the turbine buckets 48 and the accelerated air form a composite stream of relatively high mass and low velocity which is exhausted in the downward direction through an exhaust outlet 52 in the lower surface of the wing. While this type of fan assembly is conventional, the amount of thrust augmentation accomplished for the size of the power plant is substantially greater than heretofore possible since the combustion products have an extremely high energy level.

Referring now to FIG. 5, a second embodiment of the combination exhaust nozzle-diverter valve 20b is illustrated. The assembly 20b has a housing 60 including a divergent wall 61 forming an internal passage 62 connecting the exhaust conduit 19b and the exhaust opening 21b. At least two ports 63 are upstream of the wall 61, the ports 63 communicating with the gas conduits 26b leading to the lift fans. As thus described, this assembly 20b is similar to the first embodiment 20a described above. Instead of having pivotally mounted plates, however, this exhaust nozzle-diverter valve assembly 20b has a plurality of spherical plates 64 which slide along a similarly shaped surface 65 of the housing 60 between first positions illustrated by solid lines and second positions illustrated by broken lines. Substantially as described previously with respect to the first embodiment, the plates 64 cooperate with the wall 61 to form a converging-diverging nozzle for supersonic flight and block the ports 63 when they are in their first position. Similarly, the plates 64 block the internal passage 62 and direct the products of combustion through the ports 63 and the gas conduits 26b to the fans when they are in their second position. The actuating mechanism has not been described, but it will be obvious that the plates 64 can be moved between the first and second positions by means of hydraulic cylinder powered actuating rods, by geared connection means, or by other suitable pilot operated actuating means.

A third embodiment of the combination exhaust nozzle-diverter valve 20c is shown by FIG. 6. In this embodiment, separate sets of parts are used for closing the nozzle and the ports. As illustrated, the assembly 20c has a housing 70 having a wall 71 forming a converging-diverging passage 72 connecting the exhaust conduit 19c and the exhaust opening 21c, the converging-diverging passage 72 having a minimum area throat portion 73. An axially movable plug 74 is mounted in the passage 72 and is movable between first and second positions, the plug 74 axially spaced from the throat 73 to permit fluid flow to the exhaust opening 21c when in the first position shown by solid lines and aligned with the throat 73 to prevent flow through the passage 72 when in the second position shown by broken lines. The housing 70 has at least two ports 75 upstream of the converging-diverging wall 71 which open into the gas conduits 26c leading to the fans. A cylindrical ring 76 having at least two ports 77 therein is mounted for rotation adjacent the ports 75, the ring 76 also being movable between first and second positions. When the ring 76 is in its first rotated position, it blocks the ports 75 to prevent flow therethrough, this first position not being shown by FIG. 6. In the second position which is illustrated, the ports 75 and 77 are aligned so that the combustion products can flow through the gas conduits 26c to the lift fans. Again, the precise actuating means is not illustrated since various arrangements will be obvious to those having skill in the art. It is important to note, however, that the actuating arrangement be synchronized so that the plug 74 and the ring 76 are simultaneously moved between their first and second operative positions.

While only one embodiment of the complete power plant and three embodiments of the combination exhaust nozzle-diverter valve have been described above, it will be obvious to those skilled in the art that modifications may be made in the invention. For example, while the power plant is shown connected to two lift fans, practical embodiments of the invention may include a third fan located in the nose of the fuselage and connected to the exhaust nozzle-diverter valve by an independent gas conduit. The invention may also be used with a plurality of gas producing means, and it will be obvious that the system concept of placing the diverter valve downstream of the afterburner may be utilized by means of a diverter valve structurally independent of the exhaust nozzle. It will also be obvious that other augmenting means, such as ejectors, could be used in the propulsion system instead of the lift fans.

While particular embodiments of the invention have been shown and described, it will be understood that various changes and modifications may be made without departing from the spirit and scope of the invention, and it is intended to cover all such changes and modifications by the appended claims.

What is claimed as new and desired to secure by Letters Patent of the United States is:

1. A propulsion system for use in a VTOL aircraft, said propulsion system comprising, in combination:
    (a) gas producing means including an afterburner for producing high energy products of combustion,
    (b) a converging-diverging exhaust nozzle disposed such that a propulsive stream exhausted therefrom is directed so as to propel said aircraft in the forward direction,
    (c) a first conduit connecting said gas producing means and said exhaust nozzle,
    (d) at least one port in the convergent wall of said nozzle,
    (e) a plurality of thrust fans symmetrically mounted about the longitudinal axis of said aircraft and disposed such that propulsive streams exhausted therefrom are directed so as to lift said aircraft,
    (f) each of said fans comprising a compressor portion and a turbine portion drivingly connected to said compressor portion, a first inlet communicating with said compressor portion for supplying ambient air thereto, a second inlet communicating with said turbine portion for supplying high energy motive fluid thereto, and an outlet communicating with both of said compressor and turbine portions for exhausting fluid therefrom as a propulsive stream to produce lift on said aircraft,
    (g) a second conduit interconnecting said port and said second inlets,
    (h) movable valve segments,
    (i) and means to move said valve segments between first and second operative positions,
    (j) said valve segments in said first position blocking said port and directing the high energy products of combustion through said exhaust nozzle to propel said aircraft in the forward direction,
    (k) and said valve segments in said second position blocking said exhaust nozzle and directing the high energy products of combustion through said port and said second conduit to said thrust fans to produce lift on said aircraft.

2. A propulsion system as defined by claim 1 in which said valve segments are pivotally mounted plates, said plates forming the converging wall of said exhaust nozzle in said first position and projecting into said first conduit to block said exhaust nozzle in said second position.

3. A propulsion system as defined by claim 1 in which said valve segments are slidably mounted plates, said plates forming the converging wall of said exhaust nozzle in said first position and projecting into said first conduit to block said exhaust nozzle in said second position.

4. A combination exhaust nozzle-diverter valve assembly for use in high speed VTOL aircraft, said assembly comprising:
    (a) a housing having at least one port therein,
    (b) a first wall downstream of said port with respect to the direction of fluid flow through said assembly, said first wall diverging outwardly in the downstream direction and defining a divergent passageway,
    (c) a plurality of movable valve segments upstream of said first wall,
    (d) and means to move said valve segments between first and second operative positions,
    (e) said valve segments in said first position defining a second wall converging in the downstream direction to form with said first wall a converging-diverging nozzle, said port being formed in the convergent portion of said nozzle, said second wall blocking said port to prevent fluid flow therethrough,
    (f) and said valve segments in said second position defining a third wall blocking the divergent passageway defined by said first wall to prevent flow therethrough and permitting fluid flow through said port.

5. A combination exhaust nozzle-diverter valve assembly as defined by claim 4 in which said valve segments are pivotally mounted at their downstream ends.

6. A combination exhaust nozzle-diverter valve assembly as defined by claim 4 in which valve segments are slidably mounted plates.

References Cited by the Examiner

UNITED STATES PATENTS

| 2,501,078 | 3/1950 | Newcomb | 244—15 |
| 2,510,506 | 6/1950 | Lindhagen et al. | 60—35.6 X |
| 2,601,104 | 6/1952 | Douglas | 244—12 |
| 2,857,119 | 10/1958 | Morguloff | 244—52 |
| 3,084,508 | 4/1963 | Olbrich | 60—35.54 |
| 3,176,934 | 4/1965 | Kappus | 244—12 |
| 3,177,655 | 4/1965 | White | 60—35.54 X |

FOREIGN PATENTS

| 1,259,348 | 3/1961 | France. |
| 723,160 | 2/1955 | Great Britain. |
| 745,637 | 2/1956 | Great Britain. |
| 800,770 | 9/1958 | Great Britain. |
| 67,737 | 10/1957 | France. |

1st addition to French Pat. No. 1,068,404

MARK NEWMAN, *Primary Examiner.*

A. L. SMITH, *Assistant Examiner.*